United States Patent
Khafizov et al.

[11] Patent Number: 6,016,429
[45] Date of Patent: Jan. 18, 2000

[54] METHOD AND APPARATUS FOR MINIMIZING CELLULAR NETWORK COSTS WHEN UPGRADING THE ELECTRONICS IN AN EXISTING CELLULAR SYSTEM

[75] Inventors: Farid Khafizov, Dallas; Nikhil Jain, Plano; Damodar Anandampillai, Dallas, all of Tex.

[73] Assignee: Northern Telecom Limited, Montreal, Canada

[21] Appl. No.: 08/864,259

[22] Filed: May 28, 1997

[51] Int. Cl.[7] ........................................................ H04Q 7/36
[52] U.S. Cl. .......................................... 455/446; 455/422
[58] Field of Search .................................... 455/446, 447, 455/448, 449, 445, 422, 560, 561

[56] References Cited

U.S. PATENT DOCUMENTS

| | | | |
|---|---|---|---|
| 5,293,640 | 3/1994 | Gunmar et al. | 455/466 |
| 5,561,841 | 10/1996 | Markus | 455/466 |
| 5,787,350 | 7/1998 | Van Der Vorm et al. | 455/466 |
| 5,826,218 | 10/1998 | Khafizov et al. | 455/422 X |

*Primary Examiner*—Wellington Chin
*Assistant Examiner*—Philip Sobutka
*Attorney, Agent, or Firm*—Carr & Storm, L.L.P.

[57] ABSTRACT

An algorithm or method for ascertaining minimum cellular system costs is presented based on the recognition that the proper distribution of wired network blocking probability is the prime consideration in optimizing system design for minimum cost. System costs are calculated for each of a series of VCs maximum blocking probabilities "b" wherein the total wired network blocking probability is "BP" and the channel element blocking probability for each of those calculations must not exceed "(BP−b))/(1−b)". An examination of the resulting calculations will then reveal the appropriate distribution of resources to minimize costs.

10 Claims, 3 Drawing Sheets

METHOD AND APPARATUS FOR MINIMIZING CELLULAR NETWORK COSTS WHEN UPGRADING THE ELECTRONICS IN AN EXISTING CELLULAR SYSTEM

TECHNICAL FIELD

This invention pertains generally to wireless communications systems for servicing mobile subscribers, and in particular to minimizing the cost of a wireless communications system assembled to provide a given grade of service to a given number of subscribers by selecting the optimum numbers of service blocking elements. This cost minimization is accomplished by determining the most cost effective distribution of the blocking probability between channel elements in base stations and vocoders in base station controllers.

BACKGROUND

The most prevalent form of a mobile wireless communication system is a cellular network. In such a network, a territory serviced by it is divided into a plurality of geographically substantially distinct, but normally overlapping cells. Within each cell is a base station transceiver subsystem (BTS) at which there is an antenna or antenna array connected to a bank of radio transmitters and receivers (hereinafter "radios") for communicating with mobile radios (phones) within the territory. These radios are controlled by a base station transceiver controller or more popularly shortened to base station controller (BSC). A plurality of these BTSs are connected through the BSC by data and voice links to a mobile telecommunications switching office (MTSO) or also known as a mobile telephone exchange (MTX). This link is often a telephone line having the capacity of a T1 connection for each BTS or a microwave radio link of a different frequency than used between the BTS and the mobile radios. Within the MTX and the BSC there are a plurality of subsystems for routing calls to appropriate BTSs and for issuing instructions to the connected BTSs.

The MTX connects calls between two mobile radios within the network, between the mobile radios and the public switching telephone network ("PSTN") and occasionally between a mobile radio of that system and a radio of a foreign mobile system. As is known by those skilled in the art, there are many different formats used for communicating to the mobile radios such as FDMA (Frequency Division Multiple Access), TDMA (Time Division Multiple Access), CDMA (Code Division Multiple Access) etc. However each MAX and its associated BSCs has, regardless of the communication format, similar internal components in that each needs enough interface ports to communicate with the BTSs, a vocoder capacity capable of providing a given grade of service during periods of maximum traffic, and a capacity sufficient to transmit/receive and to control enough different communication channels at each BTS such that the blocking level and accordingly the given grade of service is maintained.

As is known to those skilled in the art, the signals passing through the switch, on their way to and from the mobile phone are switched in time or space or both by elements of the MTX. The incoming signals, after passing through the switch are passed through vocoders in a base station controller (BSC) on the way to one of the channel elements in a base station. A single base station may be connected to more than one interface port.

Typically the design of at least the vocoder portion of a BSC is modular so that when system signal handling capacity is increased, the capacity is increased in incremental blocks of vocoders. In other words the number of vocoders in a selector bank (part of a traffic switch in a BSC) module might be 12. If 13 vocoders were required, then two modules would be required, providing 11 unnecessary selector elements. The design of the base stations connected to the system is also modular at least in the portion which may contribute to signal blocking. Further, a channel element module might contain 8 channel elements as opposed to the 12 vocoders in the BSC. This modular situation acts to cause system costs to change in a non-linear manner with changes in blocking probability. It should also be realized that, if the system is "over-designed" to insure that the customer designated grade of service is obtained, it will also be "over costly".

Call blocking in the wired portion of a cellular network primarily occurs due to the lack of channel elements (typically, lack of channel cards) at the BTS and/or vocoders (comprising a part of a SBS (Selector Bank Subsystem) block in a given specific system) portion of a BSC. Given a total blocking probability BP for the wired network portion of the system by the customer or someone responsible for total system design, a system designer must distribute the blocking between the SBSs and the BTSs. As previously mentioned, deployment of these resources is typically imprecise, due to the modular deployment of the channel and selector elements. Thus an attempt at optimum design or allocation of assets to obtain a minimum cost while staying within required design blocking parameters has typically entailed luck, experimentation and guesswork.

The average busy hour cell traffic is typically specified to the system designer or it can be measured when the design is for the purpose of upgrading an existing system. Most system designs use the same average busy hour traffic for all cells. As is known to those skilled in the art, cell traffic depends upon many variables including the network topology, the number of users in the cell, as well as in the neighboring cells, and the frequency of handoff occurrences. A handoff occurs when the mobile radio is moving from one cell to another with respect to geographical location as well as with respect to the radio environment or RF environment. Movement for a handoff with respect to the "radio environment" or "RF environment" involves the mobile radio going into a fading condition. Therefore, the words "moving" and "distance" in this discussion refer to changing not only the geographical position but also the RF environment. The term "handoff" refers to the transferring of communications from the mobile customer by the MTX or the BSC from one cell BTS to another cell BTS. In many older systems, the switching operation involves the mobile phone receiving information as to the frequency to be used in connecting to the new BTS, changing to the new frequency (thus causing an immediate disconnection from the old BTS), and establishing a connection with the new BTS before the call can continue. CDMA systems can actually allow the mobile phone to be connected to the new BTS before being disconnected from the old BTS and thus a term was coined of "soft handoff" or SHO for this type of handoff. When it is obvious to which adjacent cell a mobile radio is being transferred, it is referred to as a "two way handoff." However, at times, a mobile radio approaches the influence of two adjacent cells simultaneously, and, thus, both of the affected BTSs must be prepared to receive the incoming mobile radio depending upon the direction that the mobile radio takes upon leaving a given cell. This handoff is designated in the prior art as a "three way handoff." Once the mobile customer is communicating with another cell, the communication channels reserved in the other two cells are released for reuse by other customers.

Call blocking in any telephone system is primarily due to failure of a communication link or unavailability of dedicated services to support the call. The blocking experienced in any mobile telephone system is from two different media. One is the area interface, or RF blocking, and the other is the wired cellular network or network blocking. Usually, the purchaser of a system intends to provide a given total end-to-end blocking grade of service. The designer of the system being delivered to the purchaser distributes this end-to-end blocking probability between the area interface and the network itself.

RF blocking probability is defined as the probability that a call (originating from or terminating at a mobile radio in a cell) gets blocked at the area interface between the mobile radio and the BTS or base station. The blocking probability at the area interface depends heavily on the changing RF propagation environment in the coverage area of each sector or cell. It also depends upon the location of the mobile radio with respect to that of the individual sector or cell antennas. It is possible that a mobile radio may be well within the coverage area of a cell but may have a best RF path to an entirely different cell in the network due to holes in the coverage of the first mentioned cell. RF blocking probability is typically estimated during the RF planning process and is updated with results obtained from field tests. The field tests will often define the holes in the coverage.

A call is typically blocked in the wired network portion of a mobile telephone system by the main switch within the system or an associated base station. There are three primary reasons for this to happen. A first reason is loss of voice or control packets in the packet switch portion of the network. It will be noted, however, that loss of voice packets only affects call quality in most situations. A second reason is the lack of channel elements in a base station, and the third reason is the lack of vocoders in a switch. Some networks use packet switching for both control and voice in the BSC and the BTS; however, the main switch used in conjunction with the present invention preferably uses packet switching for control and circuit switching for voice.

Loss of control packets may occur due to a finite buffer size at the BTS nodes. Buffers and links are typically engineered such that the packet loss probability is much lower than typical blocking probabilities assumed for inadequate numbers of selector elements or channel elements. Thus, in most engineering design considerations, the blocking probability due to the buffer size limitations are typically assumed to be negligible. Cost decisions, therefore, primarily revolve around how to distribute the network blocking probability due to lack of selector and channel elements by ascertaining how to distribute the blocking probability between the BTSs and the SBSs (vocoders) within the BSC.

In the prior art, the design process has been to assume that the total blocking probability BP, for the wired network portion of the system (the MTX, the BSCs and the associated BTSs), should be divided equally between the vocoders and channel elements. Thus the system has been designed to provide enough vocoder capacity so that the vocoder blocking probability does not exceed that BP/2 value and then the number of channel elements in each BTS is arrived at the same way. In other words, if the total wired network blocking were 2.2%, the blocking of the vocoder portion would be such as to not exceed 1.1% during average busy hour traffic and the same would be true of the blocking in the channel elements. While a review of the prior art designs will show that this prior art design assumption has, in many cases, resulted in a lowest cost system design, there are also many instances where a different division of blocking probabilities between the vocoders and channel elements would have resulted in a lower cost system design than was actually obtained.

SUMMARY OF THE INVENTION

The present invention comprises a cost-effective procedure for quickly ascertaining a minimal cost, network blocking distribution. It involves a process for systematically computing a series of costs over a range of blocking probabilities such that a review of the calculated outputs will clearly illustrate the range of blocking probabilities for one of either vocoders or channel elements that will provide the lowest system costs for the wired network portion of the cellular phone system.

In an existing system, the average busy hour traffic at each BTS is known from daily measurements and this value may be converted to a value in Erlangs by anyone skilled in the art. A series of positive values from "$b_1$" to "$b_i$" strictly between 0 and a maximum total wired network blocking probability (BP) is established where the number of values "i" in the series is greater than 2. (The word strictly in math has a special meaning. Where one references a value strictly between 0 and 1, the value cannot be either of the endpoint values. i.e. not 0 and not 1.) The cost of a total system is calculated for each of these positive values where the blocking probability of the vocoder portion of the system for each of these positive values is no greater than "b" and the blocking probability of the channel element portion of the system is no greater than (BP−b)/(1−b). As will be apparent to anyone skilled in the art, for small values of blocking probability, (BP−b)/(1−b) can usually be simplified to (BP−b) without a detrimental loss in accuracy or results. Once the calculation of the costs is completed to obtain the total system costs for each of the values of "b" from $b_1$ to $b_i$, a graph can be constructed to clearly illustrate the parameters which will result in the lowest system cost

DETAILED DESCRIPTION

Figure 1:
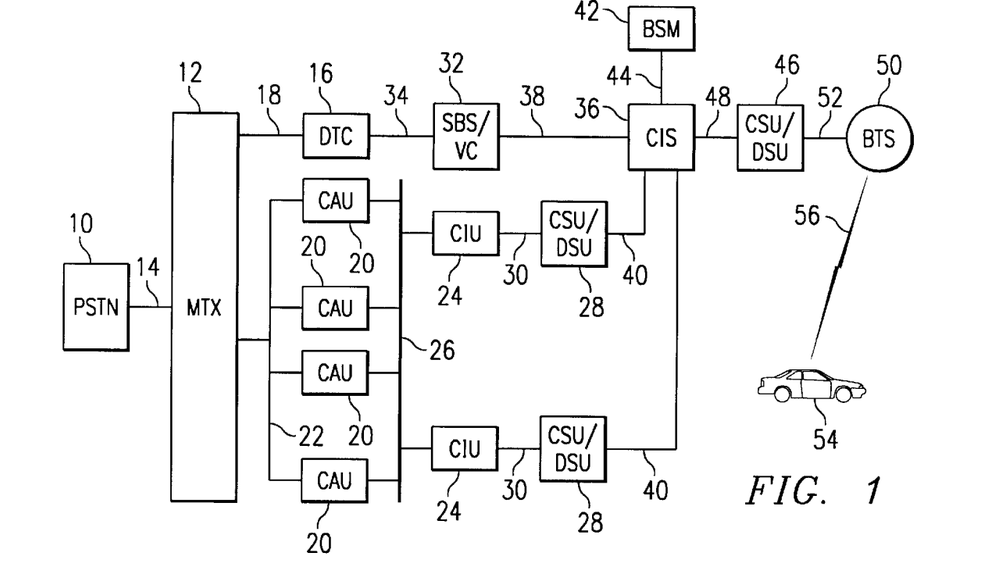
FIG. 1 is a block diagram of a representative CDMA cellular system.

The block diagram of FIG. 1 shows a public switching telephone network or PSTN block 10 connected to a mobile telephone exchange or MTX block 12 via a communication link 14. The system described is designed for CDMA, however, as previously mentioned, the inventive concept applies to systems using other communication schemes. The link 14, as well as others to be later mentioned, may be either hard wired or some other form such as light waves, radio waves or microwaves. The terms link or connected as used herein is deemed to include not only wire but any other suitable form of communicating information between devices. The MTX 12 is connected to a digital trunk controller or DTC 16 via a link 18 which in a preferred embodiment of the invention was a DS-512 link. A plurality of CDMA (Code Division Multiple Access) application units or CAUs 20 are connected to MTX 12 via a bus or link 22 which in a preferred embodiment of the invention was a DS-30 link. A pair of CDMA interface units or CIUs 24 are shown connected to the plurality of CAUs 20 via a bus 26. Each of the CIUs 24 are connected to a customer service unit/date service unit or CSU/DSU block 28 via a link 30. A selector bank subsystem (SBS) including a plurality of vocoders (VC) is represented by a block 32 labeled SBS/VC is connected to DTC 16 via a link 34. SBS/VC block 32 is connected to a CDMA interconnect system or CIS block 36 via a link 38. The CSU/DSU blocks 28 are connected to CIS 36 via links each labeled 40. A base station manager or BSM 42 for controlling the actions of the various base stations and assigning communication channels communicates with CIS 36 via a link 44. A further CSU/DSU block 46 is connected to CIS block 36 via a link 48. A base station transceiver or BTS 50 is connected to CSU/DSU block 46 via a link 52. The BTS 50 communicates via radio links with mobile phones within communication range of the BTS 50. A mobile phone is represented by a vehicle 54 and a phone therein is connected to the system by a link 56. Although only one vehicle is shown in FIG. 1 for illustrative purposes, it will be obvious that many other phones not shown may also be in simultaneous communication with BTS 50. Also, a plurality of other BTSs (not shown) would be connected to the MTX 12 via the CIS 36. The links 30, 34 and 52 in a preferred embodiment of the invention were T1/E1 links while links 38, 40, 44, and 48 were medium speed serial links (RS-422). Although not specifically shown, an MTX, such as 12, will include a message switch or MS for communicating with the CAUs and a computing module or CM for general computations. Further, the MTX 12 will communicate with the BSM 42 and the BTSs such as 50 using message packets via the CAUs while voices (even though digitized) are passed though the SBS/VC block 32. In a CDMA type system, the blocks 32, 36 and 42 comprise what is popularly known as a BSC or base station controller. In a small cellular system where there is only one set of these blocks, they may be physically located with the MTX. In large systems, requiring a plurality of BSCs, each BSC would be remote from the MTX and in proximity to the BTSs being controlled by that BSC. It may also be noted that while block 12 is labeled as MTX, the blocks 16, 20 and 24 are typically considered to be part of the MTX.

Figure 2:
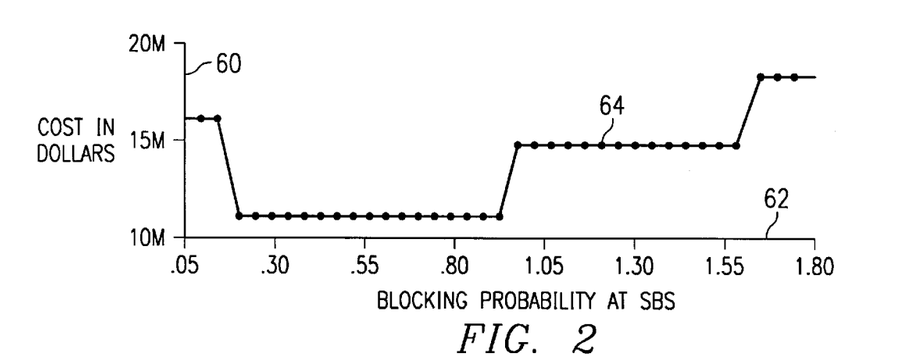
FIG. 2 is a cost graph representative of the results of using the teachings of the present invention for a first system configuration, total traffic, and blocking probability set of values.

The graph of FIG. 2 commences with 10 million dollars on an ordinate or y-axis 60 and extends to 20M. An abscissa or x-axis 62 commences with a blocking value of 0.05% and extends to 1.8% since calculations using the assumed extremes of 0 and 2 are meaningless (an answer of infinite). A graph line 64 represents a series or set of calculated values in dollars obtained using various values of blocking probability for the vocoders in the SBS/VC 32. As will be noted, the lowest calculated costs occurred for a range of blocking probability between about 0.25% and about 1.0%.

Figure 3:
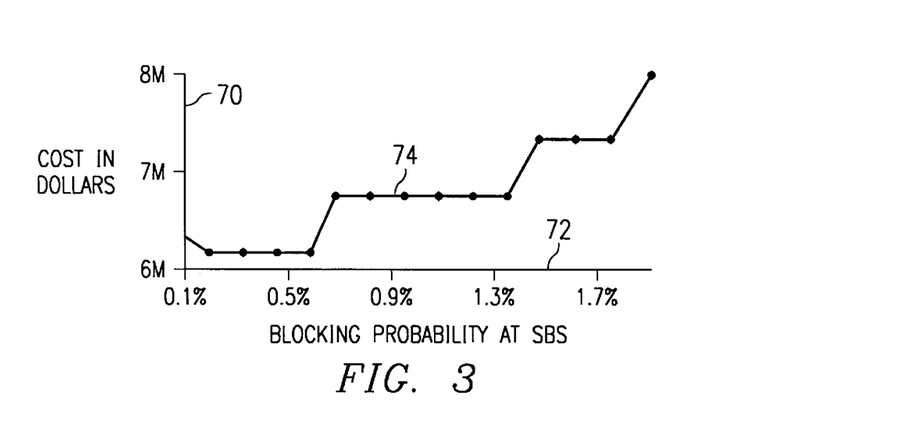
FIG. 3 is a cost graph representative of the results of using the teachings of the present invention for a second system configuration, with second system values of total traffic, and blocking probability.

The graph of FIG. 3 commences with 6 million dollars on an ordinate or y-axis 70 and extends to 8 M. An abscissa or x-axis 72 commences with a blocking value of 0.01% and extends to at least 1.7%. A graph line 74 represents a series or set of calculated values in dollars obtained in using various values of blocking probability for the vocoders in the SBS/VC 32. As will be noted the lowest calculated costs occurred for a range of blocking probability between about 0.2% and about 0.6%.

Figure 4:
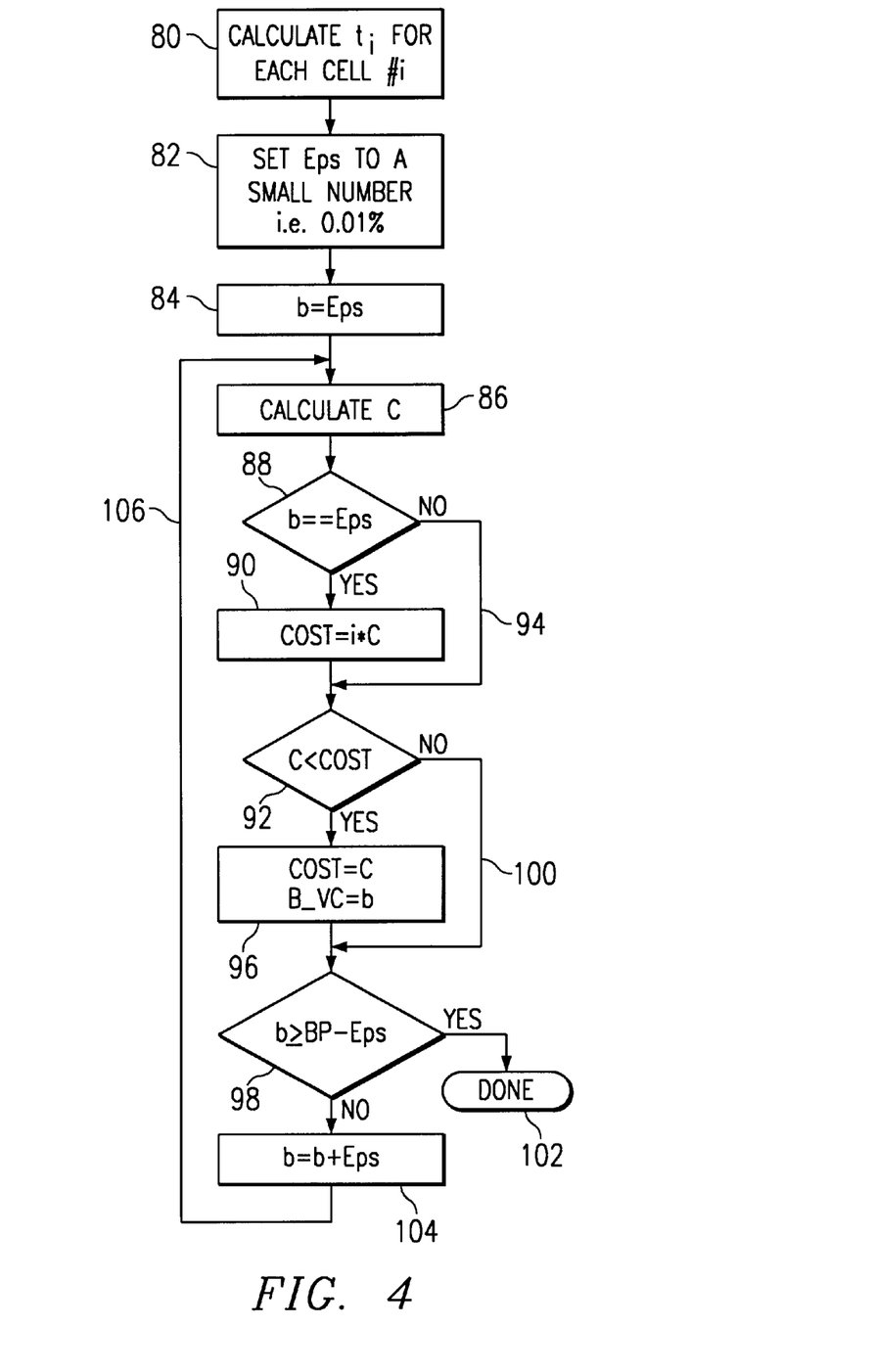
FIG. 4 is a flow diagram of a process that will provide a calculation of a minimum system cost and the distribution of blocking probabilities to obtain that cost and which process may be used to provide the indicia for the graphs of FIGS. 2 and 3.

In FIG. 4, the flow diagram initializes the algorithm in block 80, to produce the points of a graph where traffic with handoff overhead "$t_i$" is calculated for each of six cells #i surrounding a given typical cell in accordance with formula (1) below. To perform these calculations, the traffic "$n_i$" in each cell #i, and the total traffic "T" in Erlangs at the vocoders in SBS/VC block 32 must first be known by measurements or assumed as a design objective as are the handoff (SHO) factors "p" and "q". An example of handoff factors might be p % for 2-way SHO and q % for 3-way SHO and other types of HO may be considered negligible.

$$t_i = n_i + \frac{(p + 2 \cdot q)}{6} \cdot \sum_{j=1}^{6} n_i(j) \tag{1}$$

A variable Eps is then set to some small fixed incremental number such as 0.0001 or 0.01% in block 82. In block 84, a further variable "b" is initially set to the same value as Eps. In block 86, several calculations are made as part of an iterative process in performing the algorithm to produce the graph indicia. A first calculation is the number of vocoders "N_VC" required for a given blocking probability of the selector elements in the SBS/VC block 32 is calculated. The number of vocoders required is expressed as N_VC=func (b,T) (i.e. a function of the vocoder blocking probability value "b" and the total traffic "T" in Erlangs) and, as mentioned supra, changes in a non linear fashion since typically a predetermined number of vocoders comprise a part of modular elements. As a second calculation, the number of channel cards "N_CC" in the BTS blocks such as 56 must also be determined. N_CC=func((BP−b)/(1−b), $t_i$) (i.e. is a function of wired network blocking probability BP less the most recently set vocoder blocking probability "b" and is further a function of "$t_i$" as calculated in equation (1)). Blocking probability "BP" may be determined in accordance with equation (2) below.

$$BP = \frac{T^s/s!}{\sum_{n=0}^{s} (T^n/n!)} \tag{2}$$

In equation (2) "s" is the number of servers whereas "s!" is the factorial of that number. The other variables in this equation have been previously defined. The number of channel elements per channel card "CC" may be represented by nCE (as an example nCE may be 20 channel elements per card). For a BTS #i with traffic "$t_i$" and a blocking probability of "(BP−b)/(1−b)" the required number of channel elements "CE" is a direct function of "(BP−b)/(1−b)" and "$t_i$" and may be obtained from an Erlang B table. The total number of channel cards N_CC required for a given value of "b" may thus be found in accordance with equation (3).

$$N\_CC = \left\lceil \frac{\sum_i fE((BP-b)/(1-b), t_i)}{nCE} \right\rceil \quad (3)$$

The solution to equation (3) may be a decimal answer which in accordance with the Ceiling symbols "⌈" and "⌉" is rounded up to the whole number greater than or equal the number of channel cards. For redundancy, it may be advisable to add a further channel card containing an additional set of channel elements.

The last set of calculations in block 86 is to determine C. The cost "C" of a system having the current value of blocking probability "b" is computed in accordance with the formula listed as equation (4)

$$C = VC\_Price \cdot N\_VC + CC\_Price \cdot N\_CC + CAU\_Price \cdot N\_CAU \quad (4)$$

As will be apparent, VC_Price is the cost of a single vocoder, CC_Price is the cost of a single channel card and CAU_Price is the cost of a single CAU. The process for determining the number of channel cards required N_CC was outlined above. The calculation of the number of vocoders required N_VC is somewhat more complicated and is outlined in FIG. 5.

The process then proceeds to decision block 88 where the value of "b" is compared to the value of Eps. If it does compare, as it would on only the first iteration, the variable Cost is assigned a large value such as 2*C in a block 90. From block 90 the process continues to decision block 92. If "b" does not exactly compare to the value of Eps, and it would not for each of the remaining iterations after the first one, the process bypasses block 90 via path 94 to proceed to decision block 92. If the value of "C" as computed in block 86 is less than the last set value of "Cost", the process continues to block 96 where "Cost" is set equal to "C" and B_VC is set equal to the last incremented value of "b". Although not shown in this figure, the values of C and b as found in block 96 may be used to define a point in a graph such as shown in FIG. 2. From block 96, the process continues to decision block 98 where a determination is made as to whether the incremented value of "b" is either equal to or greater than the difference between "BP" and "Eps". It may also be noted that if decision block 92 results in a no or "N" because the calculated cost C is greater than a previously found cost, the process bypasses the updating block 96 also proceeds to block 98 via a path 100. If it is determined in block 98 that "b" is the same or greater than (BP-Eps), the process is completed proceeds to "Done" block 102. Otherwise, the process continues to block 104 where "b" is incremented by the value of "Eps". The process then returns to block 86 via path 106 to calculate the next cost value "C" based on the new blocking probability value "b".

Figure 5:
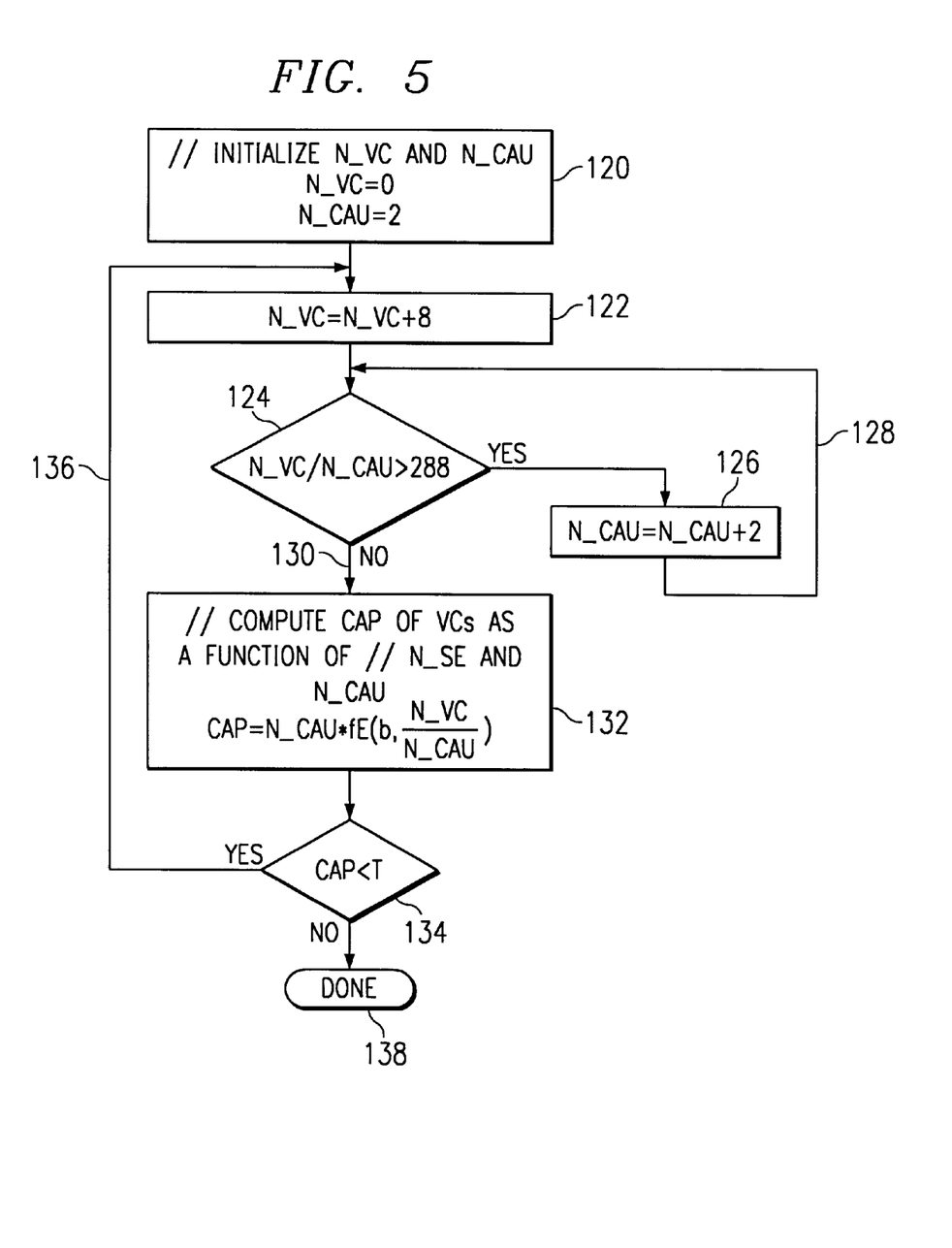
FIG. 5 is a flow diagram used in explaining how to determine the number of vocoders required to achieve a given vocoder blocking probability.

In the flow diagram of FIG. 5, comprising the steps that may be used to calculate N_VC needed as part of equation (4) used in block 86, a block 120 is used to initialize $N\_VC$ 0(zero) and $N\_CAU$ to 2 (two). A specific design configuration will be used as an example to show why no general formulas may be used in this disclosure other than the items that are functionally involved in the determination process. Any person skilled in the art of cellular phone system design will understand the specific procedures involved to ascertain the numbers of parts required and their costs to obtain a given blocking probability. Part of the process is that there is a given value "b" or blocking probability at the SBSs (comprising vocoders and otherwise termed selector elements) and a total traffic T in Erlangs. The way one application system works is that SBSs (although not detailed as such in the drawing) are evenly divided among CAUs. One of the functions of a CAU is resource sharing. Thus a CAU directs an incoming call to an associated one of its SBSs. Because of the 2N redundancy in CAU provisioning, the total number of CAUs is always even. The number of SBSs assigned to a CAU can't be more than 3 due to system design limitations. Therefore, when operating to provision an SBS action is taken to gradually increment the number of SEs until their capacity reaches T and the ratio of (N_SBS)/(N_CAU) must stay equal to or less than 3 $\{(N\_SBS)/(N\_CAU) \leq 3\}$. Because each SBS has 12 selector cards and each selector cards has 8 vocoders (VC), one SBS=96 VCs. Thus $(N\_SBS)/(N\_CAU) \leq 3$ can be rewritten as $N\_VC/N\_CAU \leq 288$. Because all VCs are divided evenly among CAUs, when the capacity of all VCs are computed, the reverse Erlang-B formula, fE, must be applied to N_CAU pools of vocoders, each of size N_VC/N_CAU.

In accordance with the above, N_VC and N_CAU are initialized in a block 120. Then, in a block 122, N_VC is incremented by 8. Proceeding to decision block 124, the value N_VC/N_CAU is checked to see if it is greater than 288. If it is, the number of CAUs is incremented by 2 in block 126 and the process returns to decision block 124 via path 128. If $N\_VC/N\_CAU$ is less than 288, a path 130 causes the process to enter block 132 where the capacity (CAP) of the VCs is determined. If, with the numbers selected thus far, the capacity (CAP) is less the given traffic T, a decision block 134 causes a return to block 122 via path 136. However, if the capacity is at least that of total traffic T, the procedure is completed for this iteration in step 138.

OPERATION

Although the operation of the present invention should be obvious to one skilled in the art, a brief review and explanation will be provided herein.

A brief examination of FIG. 1 will show that there are many components in a typical cellular system besides the MTX 12, the vocoders in the switch and the channel elements in each of the base stations, one of which is represented by BTS 50. However these other many components do contribute to the total cost and do in some cases restrict the range of blocking probabilities that can be obtained. Typically, the CIS 36 has a given maximum number of ports that may limit either the number of BTSs connected or the number of CAUs 20 connected through the CIU 24 and SCU/DSU 28 combinations. Also as explained previously, a single CAU cannot support more than 3 SBSs. Further the number of CAUs must always be even to accomplish a required redundancy. Thus the cost calculation is very time consuming for each value of selector element blocking probabilities and as a practical matter can only be accomplished on a iterative basis with a computer programmed to take into account all the limitations and requirements for different combinations of elements.

As mentioned previously, the prior art approach to the design of a system has been to determine the total wired network blocking probability BP and to then calculate the number of vocoders required to not exceed a VC blocking probability of BP/2 and to perform a similar computation for the number of channel elements required in each base station to not exceed a blocking probability of BP/2. While this educated guess for division of call blocking between the wired system elements primarily responsible for this blocking has accomplished past requirements, minimum system costs have become an increasingly important element to survival in the competitive market.

The present invention involves the concept of checking system costs for each of a plurality of system designs using blocking probability values "b" over the range from zero to BP for one of the two elements primarily contributing to call blocking, (i.e. VCs and channel elements) and "(BP–b)/(1–b)" for the other.

Using the information from a plurality of calculations the graph of FIG. 2 was generated as a first example of the use of the invention. As will be observed, when a maximum number of VCs is used, the blocking probability may be very low but, as shown for the system represented by FIG. 2, the cost was $15 M until the VC blocking probability exceeded a value of about 0.2%. For VC blocking probability from about 0.25% to about 1.0% the system cost was about $11M. For higher values of VC blocking probability, the cost is shown to rise back to $15M and over $20M for the highest values shown. When the VC blocking probability is high, the channel element blocking probability is relatively low and with a large plurality of base stations it is readily apparent why the system cost would rise drastically if each base station required many channel elements. If it may be assumed that the total allowed wired network blocking probability BP is 1.9% (a probability value that would typically supplied by a customer of an existing system that is being upgraded), it will be apparent that the prior art practice of designing a system such that the selector element blocking probability is BP2 or 0.95% would have actually resulted in a minimum cost system.

FIG. 3 represents a graph of a system to be upgraded that has entirely different parameters than the system represented by FIG. 2. The system configuration represented in FIG. 3 starts with a low system cost of slightly more than $6M for small values of selector element blocking probability and the system cost continues to rise after the selector element blocking probability increases past about 0.6%. In this system configuration, with BP/2 being equal to 0.95%, it is readily apparent that the prior art approach would not produce a minimum cost system.

The computations necessary to obtain minimum cost information can be based on using either a range of channel element blocking probabilities or a range of selector element blocking probabilities. The flow diagram of FIG. 4 uses a range of selector element blocking probabilities using an incremental value set by Eps in block 82. The flow diagram as presented when arriving at block 102 will have a value for Cost which is minimum and the appropriate selector element blocking probability in variable B_VC. If one wishes to make a graph of the form in FIG. 2 or 3, the cost for each of the incremental values of b should preferably be output after each set of calculations of C in block 86.

As presented supra, blocks 88 to 104 merely set some artificially high value for the Cost variable on the first iteration after which block 90 is bypassed. Block 92 checks each iteration to see if the calculated cost C is less than the variable Cost and bypasses the setting block 96 if it is not. Decision block 98 determines if the full range of iterations have been completed and the block 104 increments "b" to start the next computational iteration.

A method for ascertaining the appropriate distribution of blocking probability between selector and channel elements in the wired network portion of a cellular phone system for minimizing wired network costs given a total traffic T and a given maximum wired network blocking probability BP is set forth above. As indicated the computations were performed using an iterative process for a plurality of selector element blocking probabilities. The same end result could also be obtained using a plurality of channel element blocking probabilities with minor modifications to the formulas used in or in conjunction with the flow diagrams. Further much of the description was system specific and would only generally be applicable to other systems. However, anyone skilled in the art of cellular system design can readily adapt the presented algorithm to other systems. Accordingly, we wish to be limited not by the present flow diagram or implementations shown, but only by the scope of the concept as presented in the appended claims.

What is claimed is:

1. The method of utilizing a minimum cost distribution of wired network components in a cellular communication system having vocoders in a BSC (base station controller) and having a plurality of BTSs (base stations) each having channel elements, where the BSCs and the BTSs comprise a portion of a wired network, comprising, the steps of:

a) computing the number of vocoders N_VC required such that a first value of vocoder blocking probability "b" is not exceeded which value b is less than ½ the value of total allowed wired network blocking probability "BP";

b) computing the total number of channel cards N_CC required in all the BTSs such that a first value of vocoder blocking probability "(BP–b)/(1–b)" is not exceeded for any of the BTSs;

c) calculating wired system costs based on the numbers last obtained for $N\_VC$ and $N\_CC$;

d) repeating, ((BP–b)/(1–b))/b additional times, steps a), b) and c) whereby a lowest wired system cost may be ascertained from examining the results of step c) and whereby ((BP–b)/(1–b))/b, if not a whole number is rounded up to a whole number; and e) providing the vocoders and channel cards for the cellular communications system based on one or more of steps a) and b) above.

2. The method of utilizing a cost effective cellular network communications system having a total network blocking value of "BP", a fixed number of base stations and a predetermined Erlang value of average busy hour traffic comprising, the steps of:

a) establishing a series of positive values from "$b_1$" to "$b_i$" between 0 and BP where the number of values "i" in the series is greater than 2;

b) calculating the cost of a system where the blocking probability of the vocoder portion of the system is no greater than "$b_1$" and the blocking probability of the channel element portion of the system is no greater than $(BP–b_1)/(1–b_1)$;

c) repeating step b) for each of the established series of positive values from 2 to "i";

e) providing the vocoder portions and channel card portions for the cellular communications system based on step b) above.

3. The method of claim 2 comprising, in addition, the step of constructing a network communications system after examining a series of calculated costs as obtained in steps b) and c).

4. The method of claim 2 comprising, in addition, the step of examining a series of calculated costs as obtained in steps b) and c) to ascertain the distribution of components providing the most cost effective system.

5. A cellular network communications system having a total wired network blocking value of "BP", a fixed number of base stations and a predetermined Erlang value of average busy hour traffic T where the number of channel elements in a base station and the number of VCs (vocoders) in a base station controller are the primary contributors in causing network blocking comprising, in combination:

a base station controller having a number of VCs such that the blocking probability is no greater than b for traffic T; and a plurality of base stations each having a number of channel elements such that the blocking probability for each base station is no greater than BP−b for traffic T wherein, the number of VCs in the base station controller and number of channel elements in each base station is selected by calculating the system cost for each of a plurality of blocking probability values of one of the VCs and channel elements and the numbers resulting in minimum system cost are utilized.

6. The method of utilizing a cost effective cellular communication system having VCs (vocoders) in a BSC (base station controller) and having a plurality of base stations each having channel elements, where the BSC and the base stations comprise a wired network, the total blocking probability of the wired network portion of the system is no greater than BP for average busy hour traffic T, comprising, the steps of:

a) calculating the number of VCs required to prevent the VC blocking probability "b" from exceeding the value $b_i$ for a plurality of values i;

b) calculating the number of channel elements required in each base station to prevent the channel element blocking probability "(BP−b)/(1−b)" from exceeding "(BP−$b_i$)/(1−$b_i$)" for each of said plurality of values "$b_i$"; and c) calculating the total system cost when using the numbers of elements obtained above for each of the plurality of values "$b_i$"; and d) providing the vocoders and channel elements for the cellular communications system based on step b) above.

7. System for providing a cost effective cellular network communications system having a total network blocking value of "BP", a fixed number of base stations and a predetermined Erlang value of average busy hour traffic comprising, in combination:

a) means for establishing a series of positive values from "$b_1$", to "$b_i$" strictly between 0 and BP where the number of values "i" in the series is greater than 2;

b) means for calculating the cost of a system where the blocking probability of the vocoder portion of the system is no greater than "$b_1$" and the blocking probability of the channel element portion of the system is no greater than (BP−$b_1$))/(1−$b_1$);

c) means for repeating step b) for each of the established series of positive values from 2 to "i";

d) means for selecting a value of "b" representing a minimum system cost;

e) a vocoder portion and channel card portion for the cellular communications system configured based on step b) above.

8. The method of claim 1, wherein the step of providing comprises operating, configuring or building, some or all of the cellular communication system.

9. The method of claim 2, wherein the step of providing comprises operating, configuring or building, some or all of the cellular communication system.

10. The method of claim 6, wherein the step of providing comprises operating, configuring or building, some or all of the cellular communication system.

* * * * *

UNITED STATES PATENT AND TRADEMARK OFFICE
CERTIFICATE OF CORRECTION

PATENT NO. : 6,016,429
DATED : January 18, 2000
INVENTOR(S) : Farid Khafizov et al.

Page 1 of 4

It is certified that error appears in the above-identified patent and that said Letters Patent is hereby corrected as shown below:

Column 7, line 1     Delete "N - CC = "
Insert --N_CC =--

Column 7, line 19     Delete "$C=VC_{Price*N\_VC+CC\_Price*N\_CC+CAU\_Price*N\_CAU}$"
Insert --C=VC_Price * N_VC+CC_Price * N_CC+CAU_Price*N_CAU--

Column 7, line 58     Delete "$N\_{VC}$"
Insert --N_VC--

Column 7, line 59     Delete "0(zero)"
Insert --0 (zero)--

UNITED STATES PATENT AND TRADEMARK OFFICE
CERTIFICATE OF CORRECTION

PATENT NO. : 6,016,429
DATED : January 18, 2000
INVENTOR(S) : Farid Khafizov et al.

Page 2 of 4

It is certified that error appears in the above-identified patent and that said Letters Patent is hereby corrected as shown below:

Column 7, line 59        Delete "$N\_{CAU\,to}$"
Insert --N_CAU to--

Column 8, lines 13-14        Delete "$\{(N\_{SBS)/(N\_{CAU})}\leq 3\}$"
Insert --{(N_SBS)/(N_CAU)≤3}--

Column 8, line 16        Delete "$(N\_{SBS)/(N\_{CAU})}\leq 3$"
Insert --(N_SBS)/(N_CAU)≤3--

Column 8, line 16        Delete "$N\_{VC/N\_{CAU}}\leq 288$"
Insert --N_VC/N_CAU≤288--

Column 8, line 27        Delete "$N\_{VC/N\_{CAU}}$"
Insert --N_VC/N_CAU--

UNITED STATES PATENT AND TRADEMARK OFFICE
CERTIFICATE OF CORRECTION

PATENT NO. : 6,016,429
DATED : January 18, 2000
INVENTOR(S) : Farid Khafizov et al.

It is certified that error appears in the above-identified patent and that said Letters Patent is hereby corrected as shown below:

| | |
|---|---|
| Column 8, line 30 | After "less" Insert --than-- |
| Column 8, line 55 | Delete "a" (first occurrence) Insert --an-- |
| Column 9, line 26 | After "typically" Insert --be-- |
| Column 9, line 29 | Delete "BP2" Insert --BP/2-- |
| Column 10, line 5 | After "Further" Insert --,-- |

UNITED STATES PATENT AND TRADEMARK OFFICE
CERTIFICATE OF CORRECTION

PATENT NO.   : 6,016,429
DATED        : January 18, 2000
INVENTOR(S)  : Farid Khafizov et al.

It is certified that error appears in the above-identified patent and that said Letters Patent is hereby corrected as shown below:

Column 10, line 30    Delete "$N\_{VC}$ and $N\_{CC}$"
                      Insert --$N\_VC$ and $N\_CC$--

Column 10, line 54    After ";"
                      Insert --and--

Column 10, line 55    Delete "e)"
                      Insert --d)--

Column 11, line 34    After ""$b_i$";"
                      Delete --and--

Column 12, line 22    After "cost;"
                      Insert --and--

Signed and Sealed this

Twenty-second Day of May, 2001

Attest:

Attesting Officer

NICHOLAS P. GODICI

Acting Director of the United States Patent and Trademark Office